A. A. SMELL.
FENDER.
APPLICATION FILED MAR. 10, 1916.

1,202,599. Patented Oct. 24, 1916.
2 SHEETS—SHEET 1.

Witnesses,

Inventor
A. A. Smell.
By ........ Attorney

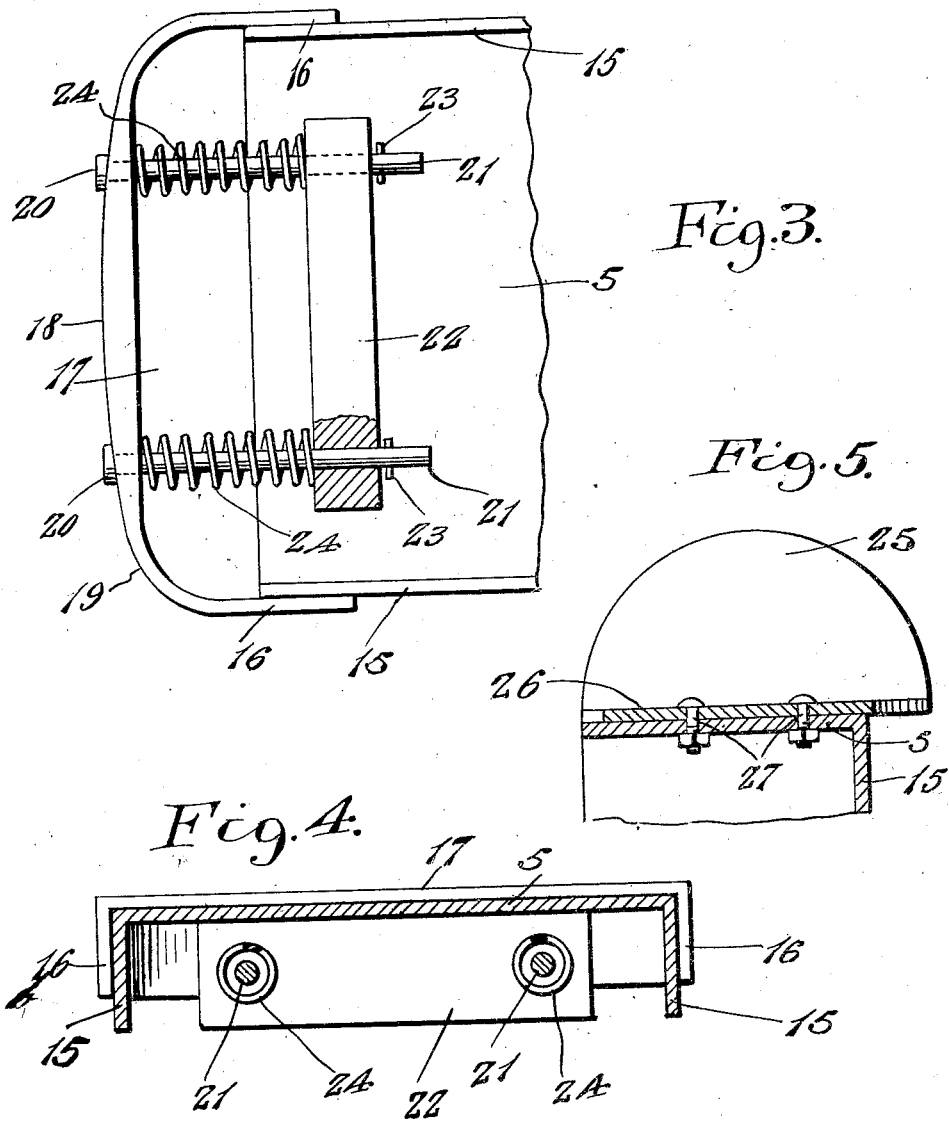

UNITED STATES PATENT OFFICE.

ALBERT A. SMELL, OF MUNCIE, INDIANA.

FENDER.

1,202,599.  Specification of Letters Patent.  Patented Oct. 24, 1916.

Application filed March 10, 1916. Serial No. 83,335.

*To all whom it may concern:*

Be it known that I, ALBERT A. SMELL, a citizen of the United States, residing at Muncie, in the county of Delaware and State of Indiana, have invented certain new and useful Improvements in Fenders; and I do hereby declare the following to be a full, clear, and exact description of the invention, such as will enable others skilled in the art to which it appertains to make and use the same.

This invention relates to improvements in fenders, and more particularly to a device of this character especially designed for use in connection with modern types of motor vehicles.

The invention has for its primary object to provide an improved fender in which the fender plate is resiliently held in forwardly extended position and, when struck by a person or other object will yield under the impact of the blow and thus divert serious injury.

Another object is the provision of means for attaching the fender to a motor vehicle.

Figure 1:
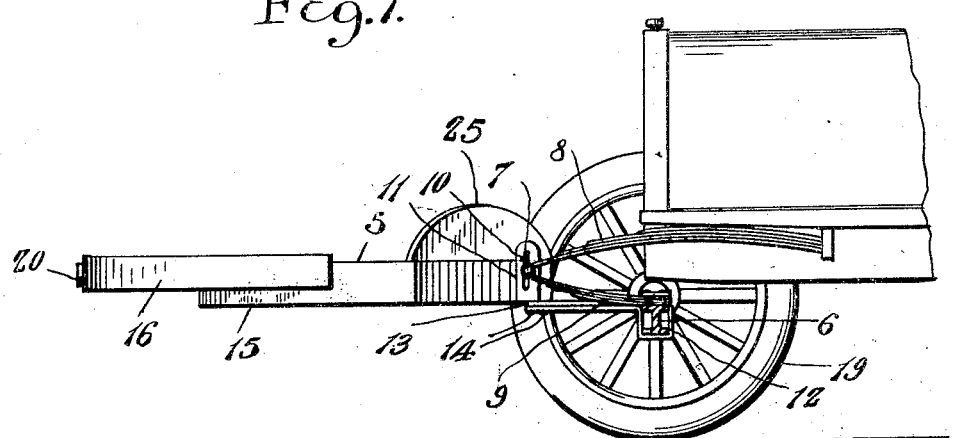
Figure 2:
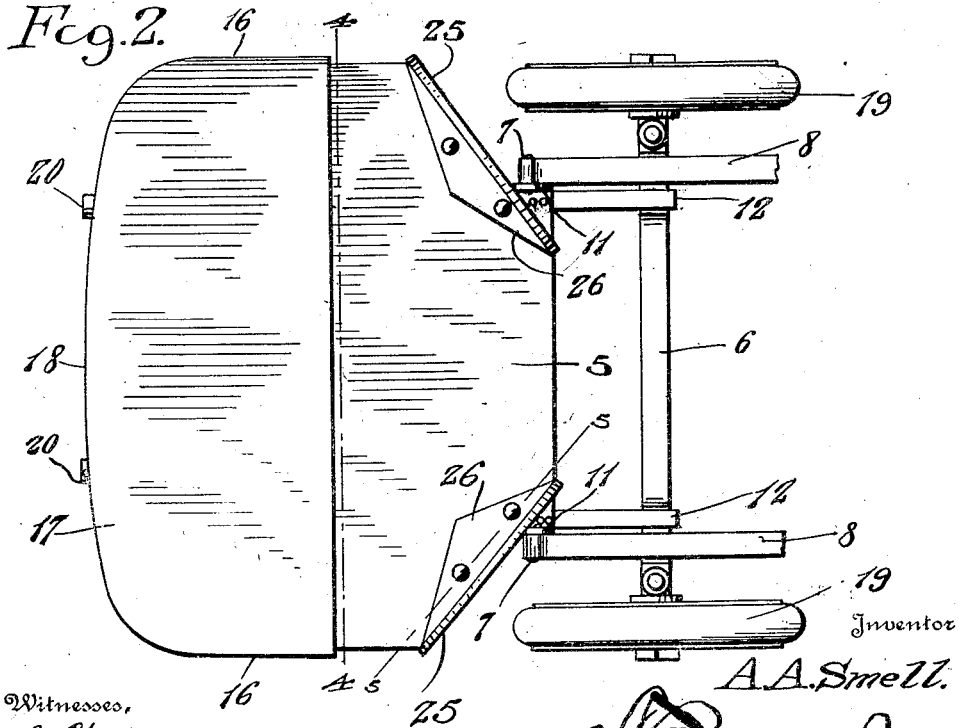

With these and other objects in view, the invention consists in the novel construction, combination and arrangement of parts as will be hereinafter specifically described, claimed and illustrated in the accompanying drawings, in which:

Figure 1 represents a fragmentary side elevation of a motor vehicle, partly in section, illustrating the improved fender in side elevation, Fig. 2 represents a top plan view of the fender applied to a motor vehicle, Fig. 3 represents a fragmentary bottom plan view, partly in section, of the fender, Fig. 4 represents a horizontal sectional view on the line 4—4 of Fig. 2, and Fig. 5 represents a detail sectional view on the line 5—5 of Fig. 2.

Referring to the drawing in detail, wherein similar reference numerals designate corresponding parts throughout the several views, the numeral 5 indicates the supporting plate of the fender which is disposed horizontally and substantially in the plane of the front axle 6 of the motor vehicle to which it is attached.

The bolts 7 connecting the front ends of the longitudinal members 8 of the vehicle frame with the front springs 9 are extended through slots 10 formed in angular supporting brackets 11, the lower horizontal extremities of which are bolted or otherwise secured to the supporting plate 5 forwardly of the front axle 6. The looped central portions of straps 12 are positioned over the front axle 6 and the free ends 13 thereof are fastened by bolts and nuts 14 to the rear end of the supporting plate 5. The straps 12 are preferably formed of spring metal so as to permit the fender to vibrate vertically as during excessive vibratory movement of the vehicle frame 8. The ordinary movement of the frame 8 with relation to the front axle 6 is compensated for by the sliding engagement of the bolt 7 with the slots 10 in the supporting brackets 11.

The side or longitudinal edges of the supporting plates are turned downwardly to provide depending flanges 15, over which are engaged the depending flanges 16 of the horizontally disposed fender plate 17, which latter is slidably mounted upon the supporting plate 5. The front curved edge 18 of the fender plate 17 extends across the path of the front wheels 19 of the vehicle, and is provided with a curved depending front flange 19 in which are secured the headed ends 20 of guide rods 21. The rear extremities of the guide rods 21 are slidably mounted in a block 22 rigidly secured under the supporting plate 5 and rearwardly of the front edge thereof, the forward sliding movement of the guide rods being limited by laterally projecting pins 23, rigidly secured thereto. Expansion springs 24 are coiled about the guide rods 21 and are engaged between the block 22 and the front flange 19 for resiliently retaining the fender plate 17 in forwardly extended position with relation to the supporting plate 5.

Auxiliary fenders or guards 25 are provided with angular lower ends 26 secured by bolts 27, or equivalent means, to the rear portion of the supporting plate 5. The guards 25 are disposed vertically and extend inwardly from the front wheels 19 of the vehicle inwardly and rearwardly toward the longitudinal axis of the vehicle, so as to prevent a person or object sliding rearwardly upon the fender and supporting plates 17 and 5, respectively, and coming into contact with the vehicle wheels 19.

What I claim is:

1. A fender including a supporting plate, means for attaching said supporting plate to a vehicle, a fender plate having depending front and side flanges, means normally retaining said fender plate in forwardly extended position, and auxiliary wheel guards extending inwardly and rearwardly from the side edges of the supporting plate.

2. A fender including a supporting plate, means for attaching said supporting plate to a vehicle, a fender plate supported upon and extending forwardly of said supporting plate and having depending front and side flanges, means normally retaining said fender plate in forwardly extended position, and auxiliary wheel guards secured to the supporting plate rearwardly of the fender plate and extending inwardly and rearwardly of the supporting plate.

3. A fender including a supporting plate, flexible straps secured to said supporting plate and having the central portions looped and adapted for engagement with the front axle of a motor vehicle, means for movably attaching said supporting plate with the forward extremities of the longitudinal members of the motor vehicle, a fender plate movably engaged with said supporting plate, means normally retaining said fender plate in forwardly extended position.

In testimony whereof I affix my signature in presence of two witnesses.

ALBERT A. SMELL.

Witnesses:
A. E. NEEDHAM,
CHARLINE HINKLE.

Copies of this patent may be obtained for five cents each, by addressing the "Commissioner of Patents, Washington, D. C."